UNITED STATES PATENT OFFICE.

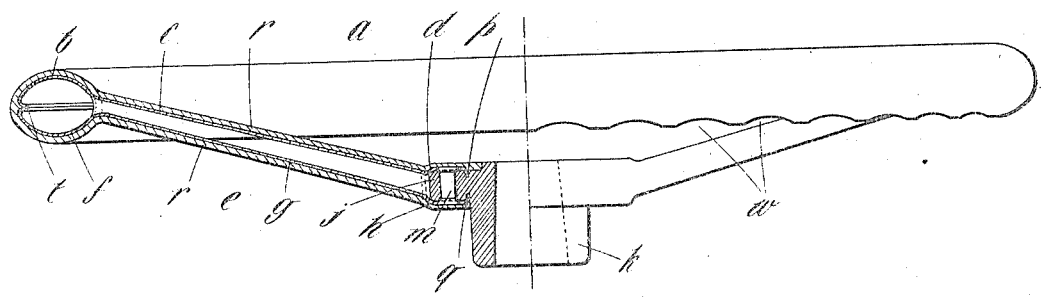
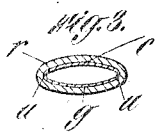
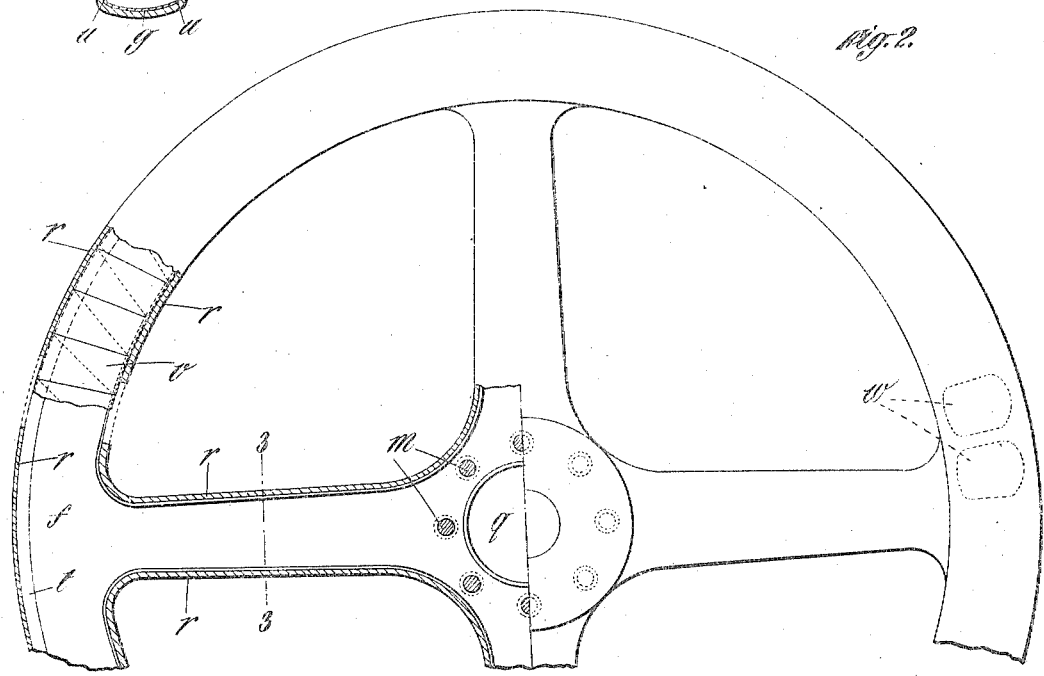

HORACE WALTER DOVER, OF NORTHAMPTON, ENGLAND.

HAND-WHEEL.

1,294,885.   Specification of Letters Patent.   Patented Feb. 18, 1919.

Application filed December 6, 1917.   Serial No. 205,810.

*To all whom it may concern:*

Be it known that I, HORACE WALTER DOVER, a subject of the King of Great Britain, and resident of Holyrood, St. James End, Northampton, in the county of Northampton, England, have invented certain new and useful Improvements in or Relating to Hand-Wheels, of which the following is a specification.

This invention relates to hand wheels such for instance as are employed for steering motor vehicles, for operating stop cocks, controlling aircraft, motor boats, gun mechanism, and for other purposes, and has for its object to facilitate the assembling of the parts of the wheel and to cheapen the cost of construction.

According to the present invention, the wheel is built up of two parts (*i. e.* an upper half and a lower half, relatively to the central plane of the wheel) one or both of which may be formed of stamped sheet metal, and which are held together by a casing of moldable material, applied around the parts according to well-known methods of manufacture, with or without an initial wrapping of tape, of linen or other fabric, spirally applied.

The words "moldable material" wherever referred to in the specification and the annexed claims are intended to include material such as celluloid, exonite, or like compound, of a non-inflammable material capable of being molded in a similar manner.

In the accompanying drawings, which illustrate one form of wheel constructed in accordance with the present invention, Figure 1 is a side view and Fig. 2 a part plan view of the improved wheel, while Fig. 3 is a section on line 3—3 of Fig. 2. Those parts of Figs. 1 and 2 which are to the right of the center line are shown in elevation and plan respectively, while those parts to the left of the same line are shown either wholly or partly in section.

*a* is a stamping constituting the upper half of the wheel, and formed with an annular rim-portion *b*, a plurality of half-spokes *c*, and a half-nave *d*. *e* is a stamping constituting the lower half of the wheel, and formed with portions *f*, *g*, and *h* corresponding respectively to the portions *b*, *c*, and *d* of the stamping *a*, so that the two stampings, when superposed one upon the other, together form a wheel whereof both the rim and the spokes are elliptical in cross section.

At their inner ends, the upper and lower halves *c* and *g* of the spokes merge into the upper and lower halves *d* and *h* of the nave of the wheel; the complete nave portion thus formed being secured to a flange *j* on a hub *k* by means of rivets *m*. (At the left-hand side of Fig. 2 the hub *k* and flange *j* are omitted). The sides of the flange *j* are preferably provided with circular grooves for the reception of inwardly-turned marginal portions *p* and *q* on the stampings *a* and *e*, the hub *k* being adapted to be secured to the steering pillar in any convenient manner.

When the two stampings are assembled together, they are incased in a casing *r* of celluloid, exonite, or similar material, or of a non-inflammable material capable of being molded in a similar manner, applied according to any of the well-known methods of manufacture (*e. g.* molding), the casing serving the two-fold purpose of retaining the two stampings together and of giving a handsome finish to the wheel.

If desired, the marginal parts of the rim and spoke portions in the two stampings may be inturned so as to seat the one upon the other and strengthen the structure; the marginal parts of the rim portion being shown as inturned at *t* in Fig. 1, whereas in Fig. 3 the spoke portions of the two stampings are shown as butt jointed one against the other at *u*.

In some cases, the upper and lower portions of the rim, or those of both the rim and the spokes, may be secured together by first wrapping them spirally with a tape *v* of linen or other fabric, after which the covering compound or material may be applied as above mentioned.

In a modified form of the invention, the lower half of the rim, the whole of each spoke, and the nave of the wheel are of cast metal of hollow section, and the upper half of the rim is constituted by an annulus of U-section made of stamped or pressed sheet metal which is laid upon the lower half; the two halves of the rim are then spirally taped and incased as above set forth. If desired, the edges of the cast lower half of the rim may be adapted to fit into the concavity of the stamped upper half.

It is to be observed that the two halves of the rim themselves are not directly united but (except for the rivets in the nave of the wheel mentioned in the form of the invention first described) are held together only by the casing of covering compound or material, with or without the initial wrapping of tape, so that the assembling of the parts is much facilitated and the cost of manufacture of the wheel correspondingly reduced.

The underside of the rim portion of the lower half of the wheel may be formed by casting or stamping with a plurality of indentations or finger gaps $w$ (Figs. 1 and 2) to facilitate the gripping of the wheel by the user.

I claim:—

1. In a two-part hand-wheel, a stamped rim and spoke upper half, a rim and spoke lower half, a casing of moldable material around said upper and lower halves.

2. In a two-part hand-wheel, a stamped rim and spoke upper half, a rim and spoke lower half, a fabric wrapping around said upper and lower halves, and a casing of moldable material around said upper and lower halves and around said wrapping.

3. In a two-part hand-wheel, a stamped rim and spoke upper half, an inturned marginal portion on the rim portion of said upper half, a stamped rim and spoke lower half, an inturned marginal portion on the rim portion of said lower half, and a casing of moldable material around said upper and lower halves.

4. In a two-part hand-wheel, a stamped rim and spoke upper half, an inturned marginal portion on the rim portion of said upper half, a stamped rim and spoke lower half, a fabric wrapping around said upper and lower halves, and a casing of moldable material around said upper and lower halves.

5. In a two-part hand-wheel, a stamped rim and spoke upper half, a stamped rim and spoke lower half, a hub portion, an upper groove on said hub, a lower groove on said hub, a downwardly-bent flange on the inner end of each spoke of the upper half, an upwardly-bent flange on the inner end of each spoke of the lower half, and a casing of moldable material around said upper and lower halves.

6. In a two-part hand-wheel, a stamped rim and spoke upper half, a stamped rim and spoke lower half, a hub portion, an upper groove on said hub, a lower groove on said hub, a downwardly-bent flange on the inner end of each spoke of the upper half, an upwardly-bent flange on the inner end of each spoke of the lower half, a fabric wrapping around said upper and lower halves, and a casing of moldable material around said upper and lower halves.

7. In a two-part hand-wheel, a stamped rim and spoke upper half of U-section, a rim and spoke lower half, and a casing of moldable material around said upper and lower halves.

8. In a two-part hand-wheel, a stamped rim and spoke upper half of U-section, a cast rim and spoke lower half, a fabric wrapping around said upper and lower halves, and a casing of moldable material around said upper and lower halves.

HORACE WALTER DOVER.